United States Patent
Fukuda et al.

(10) Patent No.: US 9,985,961 B2
(45) Date of Patent: May 29, 2018

(54) INFORMATION PROCESSING SYSTEM AND AUTHENTICATION METHOD

(71) Applicants: Yasuharu Fukuda, Tokyo (JP); Masato Nakajima, Tokyo (JP); Hiroki Ohzaki, Kanagawa (JP); Shigeki Kashiyama, Tokyo (JP)

(72) Inventors: Yasuharu Fukuda, Tokyo (JP); Masato Nakajima, Tokyo (JP); Hiroki Ohzaki, Kanagawa (JP); Shigeki Kashiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 14/919,891

(22) Filed: Oct. 22, 2015

(65) Prior Publication Data
US 2016/0127356 A1    May 5, 2016

(30) Foreign Application Priority Data

Oct. 31, 2014 (JP) .................................. 2014-223357

(51) Int. Cl.
*H04L 29/06* (2006.01)

(52) U.S. Cl.
CPC ...... *H04L 63/0838* (2013.01); *H04L 63/0807* (2013.01); *H04L 63/0876* (2013.01)

(58) Field of Classification Search
None
See application file for complete search history.

(56) References Cited

U.S. PATENT DOCUMENTS

| 7,421,732 B2 * | 9/2008 | Costa-Requena ....... H04L 63/08 |
| | | 726/3 |
| 8,219,808 B2 * | 7/2012 | Belohoubek ........ H04L 63/0407 |
| | | 380/277 |

(Continued)

FOREIGN PATENT DOCUMENTS

| JP | 2012-027887 | 2/2012 |
| JP | 2012-191270 | 10/2012 |
| JP | 2015-127950 | 7/2015 |

OTHER PUBLICATIONS

Lopez, Diego R.; Castro-Rojo, Rodrigo. Ubiquitous Internet Access Control: the PAPI System. Proceedings of the 13th International Workshop on Database and Expert Systems Applications. Pub. Date: 2002. http://ieeexplore.ieee.org/stamp/stamp.jsp?tp=&arnumber=1045937.*

(Continued)

*Primary Examiner* — Jeremiah Avery
(74) *Attorney, Agent, or Firm* — IPUSA, PLLC

(57) ABSTRACT

An information processing system includes a service utilizing device and at least one information processing device to provide a service for the service utilizing device. A temporary code issuing unit to issue a temporary code is provided in the information processing device. A device authentication token generation unit is provided in the service utilizing device and generates a device authentication token by using the temporary code obtained from the information processing device. A device authentication ticket issuing unit is provided in the information processing device and verifies whether the device authentication token obtained from the service utilizing device is valid by using the temporary code and issues a device authentication ticket depending on a verification result. An access unit is provided in the service utilizing device and accesses a resource in the information (Continued)

processing device by using the device authentication ticket obtained from the information processing device.

10 Claims, 11 Drawing Sheets

(56) References Cited

U.S. PATENT DOCUMENTS

| | | | | |
|---|---|---|---|---|
| 8,627,424 | B1* | 1/2014 | O'Malley | G06F 21/335 370/254 |
| 9,032,473 | B2* | 5/2015 | Guccione | H04L 63/102 709/224 |
| 2006/0174104 | A1* | 8/2006 | Crichton | G06F 21/33 713/155 |
| 2009/0217033 | A1* | 8/2009 | Costa | H04L 63/08 713/155 |
| 2009/0320107 | A1* | 12/2009 | Corella | G06F 21/31 726/6 |
| 2012/0254959 | A1* | 10/2012 | Schmidt | H04L 63/061 726/6 |
| 2013/0036459 | A1* | 2/2013 | Liberman | H04L 9/0866 726/6 |
| 2013/0067552 | A1* | 3/2013 | Hawkes | H04L 63/166 726/7 |
| 2015/0149919 | A1 | 5/2015 | Matsuishi | |

OTHER PUBLICATIONS

Varadharajan, Vijay; Tupakula, Udaya. On the Security of Tenant Transactions in the Cloud. 2013 IEEE 5th International Conference on Cloud Computing Technology and Science (CloudCom). Pub. Date: 2013. http://ieeexplore.ieee.org/stamp/stamp.jsp?tp=&arnumber=6753842.*

Wang, Rui; Chen, Shuo; Wang, XiaoFeng; Qadeer, Shaz. How to Shop for Free Online: Security Analysis of Cashier-as-a-Service Based Web Stores. 2011 IEEE Symposium on Security and Privacy (SP). Pub. Date: 2011. http://ieeexplore.ieee.org/stamp/stamp.jsp?tp=&arnumber=5958046.*

* cited by examiner

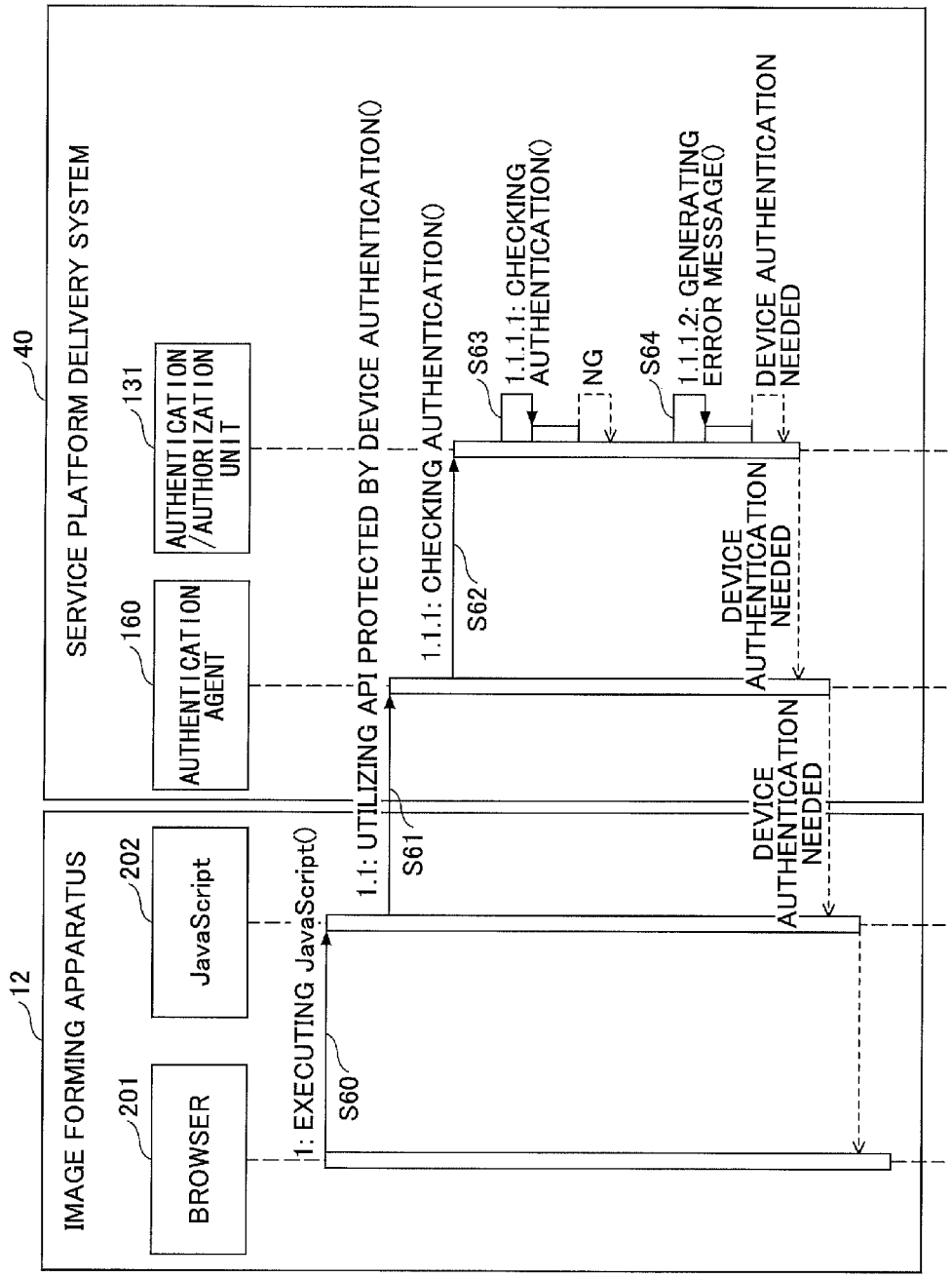

FIG.12A

| TEMPORARY CODE FOR DEVICE AUTHENTICATION |
|---|
| MODEL AND MACHINE NUMBER |
| CREATED DATE AND TIME |

FIG.12B

| DEVICE AUTHENTICATION TICKET |
|---|
| MODEL AND MACHINE NUMBER |
| CREATED DATE AND TIME |

FIG.12C

| DEVICE AUTHENTICATION PASSWORD |
|---|
| MODEL AND MACHINE NUMBER |
| CREATED DATE AND TIME |

FIG.12D

| TENANT ID |
|---|
| TENANT AUTHENTICATION KEY |

A # INFORMATION PROCESSING SYSTEM AND AUTHENTICATION METHOD

BACKGROUND OF THE INVENTION

1. Field of the Invention

The present invention relates to an information processing system and a service authentication method.

2. Description of the Related Art

In recent years, service delivery forms in which users utilize only necessary functions only when the functions are needed have been increasing. For example, the service delivery forms include SaaS (Software as a Service) that is a utility form of software in which users utilize services by selecting only desired functions, a combination of computing resources on the Internet, cloud computing that provides a highly value-added service for end users and the like as examples.

To utilize the above-mentioned services, as disclosed in Japanese Laid-Open Patent Application Publication No. 2012-191270, a method is known in which a client performs an authentication process by using an authentication token generated by using a device ID of the client on the server side.

However, in the method disclosed in Japanese Laid-Open Patent Application Publication No. 2012-191270, the authentication token is only generated by just using the device ID of the client. Hence, when information of the device ID of the client is leaked, access from another client trying to utilize the above-mentioned services cannot be controlled.

SUMMARY OF THE INVENTION

Accordingly, embodiments of the present invention may provide an information processing system and an authentication method reducing one or more of the above-described problems.

More specifically, the embodiments of the present invention may provide an information processing system and an authentication method that can improve security strength.

According to one embodiment of the present invention, there is provided an information processing system including a service utilizing device and at least one information processing device configured to provide a service for the service utilizing device. A temporary code issuing unit configured to issue a temporary code is provided in the at least one information processing device. A device authentication token generation unit is provided in the service utilizing device and is configured to generate a device authentication token by using the temporary code obtained from the at least one information processing device. A device authentication ticket issuing unit is provided in the at least one information processing device and is configured to verify whether or not the device authentication token obtained from the service utilizing device is valid by using the temporary code and to issue a device authentication ticket depending on a verification result. An access unit is provided in the service utilizing device and is configured to access a resource in the at least one information processing device by using the device authentication ticket obtained from the at least one information processing device.

According to another embodiment of the present invention, there is provided an authorization method executed by an information processing system including a service utilizing device, and at least one information processing device configured to provide a service for the service utilizing device. In the method, a temporary code is issued from the at least one information processing device. A device authentication token is generated by the service utilizing device by using the temporary code obtained from the at least one information processing device. It is determined whether the device authentication token obtained from the service utilizing device is valid by using the temporary code by the at least one information processing device. A device authentication ticket is issued from the at least one information processing device depending on a verification result. A resource of the at least information processing device is accessed by using the device authentication ticket obtained from the at least one information processing device by the service utilizing device.

Other objects, features and advantages of the present invention will become more apparent from the following detailed description when read in conjunction with the accompanying drawings.

BRIEF DESCRIPTION OF THE DRAWINGS

FIG. 11 is a diagram illustrating an example of a sequence in which whether to need a device authentication is notified; and FIGS. 12A through 12D are diagrams illustrating structural examples of various tables.

DETAILED DESCRIPTION OF THE PREFERRED EMBODIMENTS

A description is given, with reference to the accompanying drawings, of embodiments of the present invention.

<System Configuration>

Figure 1:
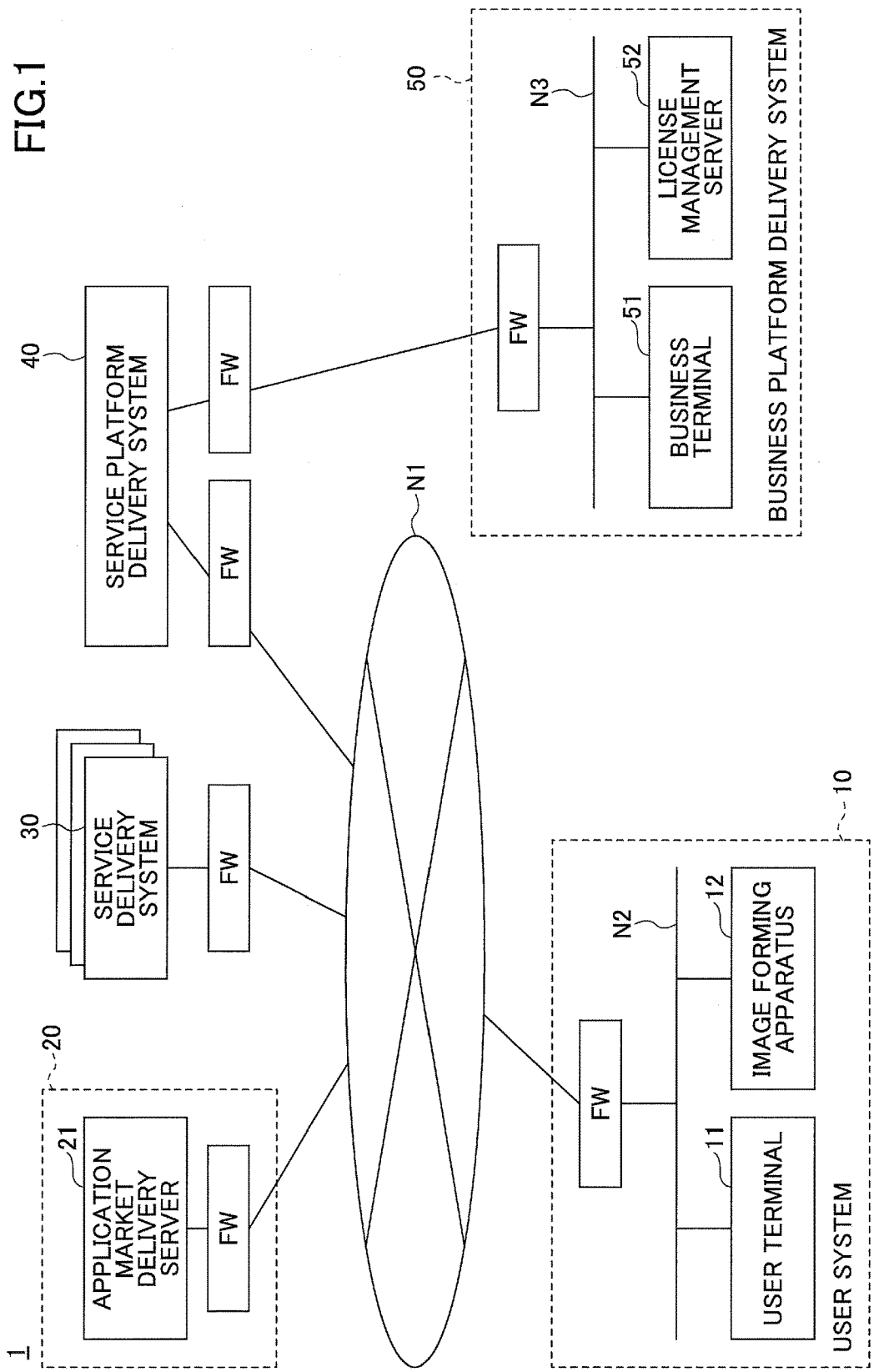
FIG. 1 is a configuration diagram illustrating an example of an information processing system according to an embodiment of the present invention.

FIG. 1 is a configuration diagram illustrating an example of an information processing system according to an embodiment of the present invention. An image forming apparatus 1 in FIG. 1 includes a user system 10, an application market delivery system 20, a service delivery system 30, a service platform delivery system 40, and a business platform delivery system 50.

The user system 10, the application market delivery system 20, the service delivery system 30 and the service platform delivery system 40 are connected to each other through a network N1 such as the Internet. The service platform delivery system 40 and the business platform delivery system 50 are connected to each other through a dedicated line.

A network N2 of the user system 10 is a private network provided inside a firewall FW. The firewall FW detects and blocks an unauthorized access. A user terminal 11 and an image forming apparatus 12 such as a multifunction peripheral are connected to the network N2. Here, the image forming apparatus 12 is an example of an electronic device a service of which a user tests or utilizes.

The user terminal 11 can be implemented by an information processing apparatus in which a general operating system has been installed. The user terminal 11 includes a wireless communication unit or a wired communication unit. The user terminal 11 is a terminal that a user can operate such as a smart phone, a cell phone, a tablet terminal, and a PC (Personal Computer).

The image forming apparatus 12 is an apparatus that has an image forming function such as a multifunction peripheral. The image forming apparatus 12 is an apparatus that performs a process related to an image formation such as a multifunction peripheral, a copier, a scanner, a printer, a laser printer, a projector, and an electronic blackboard in each of which a browser has been installed. In FIG. 1, although an example of including the single user terminal 11 and the single image forming apparatus 12 is illustrated, a plurality of user terminals 11 and image forming apparatuses 12 may be provided.

An application market delivery server 21 of the application market delivery system 20 is connected to the network N1 through the firewall FW. The application market delivery server 21 can be implemented by at least one information processing apparatus that has installed a general OS (Operating System) and the like.

The application market delivery system 20 may be provided for each sales area, company or the like. The application delivery server 21 provides an application market screen such as a service list screen and an application screen for the user terminal 11 and the image forming apparatus 12.

The service delivery system 30 is connected to the network N1 through the firewall FW. The service delivery system 30 provides a variety of services for the user terminal 11 and the image forming apparatus 12. The service delivery system 30 can be implemented by at least one information processing apparatus that has installed a general OS and the like.

A service provided from the service delivery system 30 may be a service provided from an external service provider and the like in addition to a service provided from an operator of the service platform delivery system 40.

The service platform delivery system 40 is connected to the network N1 through the firewall FW. The service platform delivery system 40 can be implemented by at least one information processing apparatus that has installed a general OS and the like.

The service platform delivery system 40 has a function such as authentication/authorization, tenant/user management, license management, and account registration. The service platform delivery system 40 receives the account registration and a login request from the user terminal 11 and the image forming apparatus 12. Moreover, the service platform delivery system 40 receives an acknowledgement request of an authentication ticket and an acquisition request of user information from the service delivery system 30.

A network N3 of the business platform delivery system 50 is a private network provided inside a firewall. A business terminal 51 and a license management server 52 are connected to the network N3. The business terminal 51 and the license server 52 can be implemented by at least one information processing apparatus that has installed a general OS and the like.

The business terminal 51 includes a wireless or wired communication unit. The business terminal 51 is a terminal that a person in charge of the business can operate such as a smartphone, a mobile phone, a tablet terminal, and a PC. The person who is in charge of the business can request an issue of a license from the license management server 52 through the business terminal 51.

The license management server 52 has a function such as license management. The license management server 52 receives a request such as an issue of license and the like from the service platform delivery and the business terminal 51. A configuration of the information processing system 1 in FIG. 1 is an example, and another configuration is possible.

<Hardware Configuration of Computer>

Figure 2:
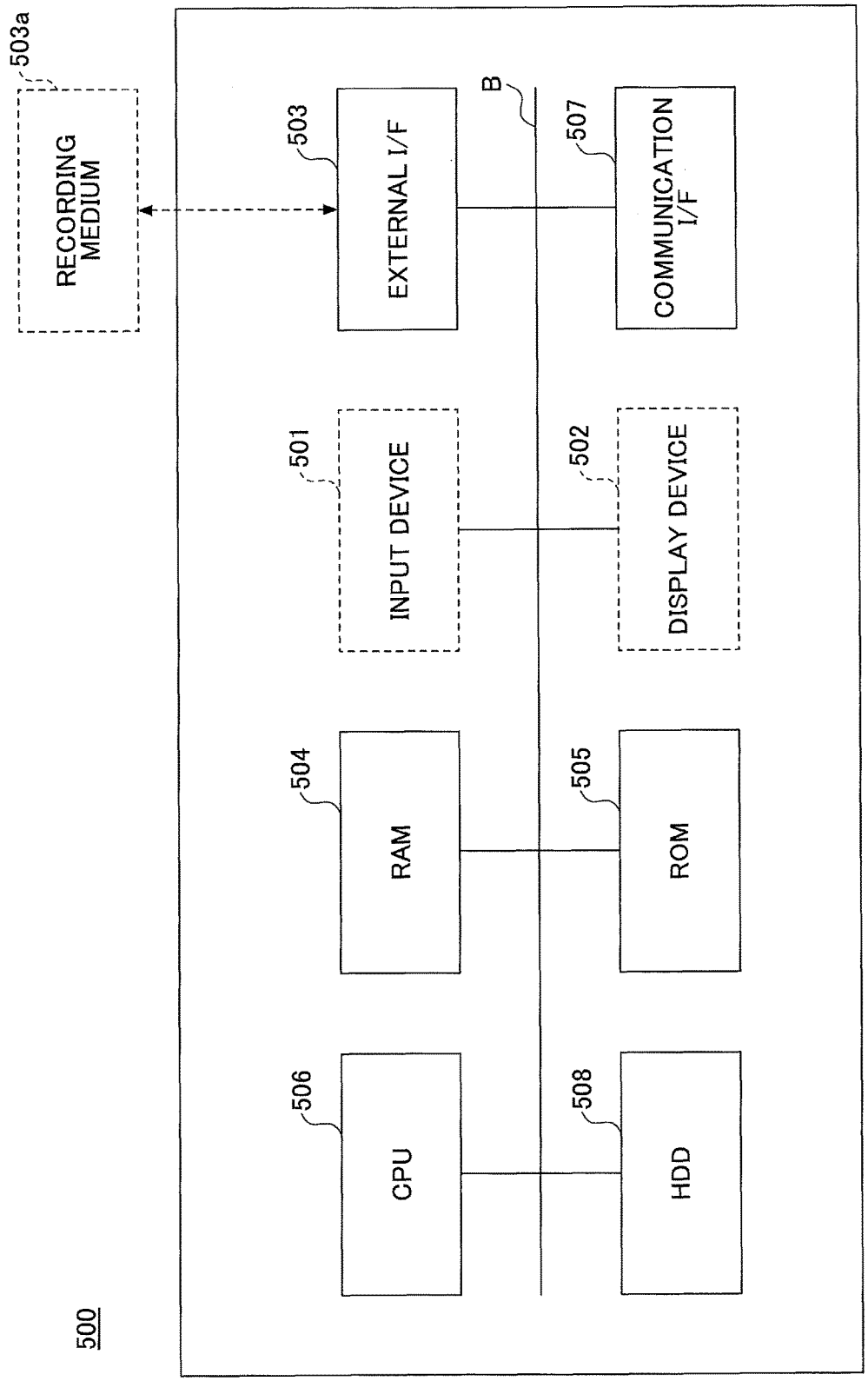
FIG. 2 is a hardware configuration diagram illustrating an example of a computer according to an embodiment of the present invention.

The user terminal 11, the application market delivery server 21, the business terminal 51 and the license management server 52 are, for example, implemented by a computer having a hardware configuration as illustrated in FIG. 2. Also, an information processing apparatus that implements the service delivery system 30 and the service platform delivery system 40 is implemented by the computer having the hardware configuration as illustrated in FIG. 2. FIG. 2 is a hardware configuration diagram of an example of a computer according to the present embodiment.

A computer 500 illustrated in FIG. 2 includes an input device 501, a display device 502, an external I/F 503, a RAM (Random Access Memory) 504, a ROM (Read Only Memory) 505, a CPU (Central Processing Unit) 506, a communication I/F 507, and an HDD (Hard Disk Drive) 508 and the like, each of which is connected to each other through a bus B. The input device 501 and the display device 502 may be connected to the bus B only when necessary.

The input device 501 includes a keyboard, a mouse and the like, and is used to allow a user to input each operation signal thereto. The display device 502 includes a display and the like, and displays a process result performed by the computer 500.

The external I/F 503 is an interface between the computer 500 and an external device. The external device includes, for example, a recording medium 503a. This enables the computer 500 to read and/or to write in the recording medium 503a through the external I/F 503. The recording medium 503a includes, for example, a flexible disk, a CD (Compact Disk), a DVD (Digital Versatile Disk), an SD memory card, a USB (Universal Serial Bus) memory and the like.

The RAM 504 is a volatile semiconductor memory (memory device) that temporarily holds a program and data. The ROM 505 is a non-volatile semiconductor memory (memory device) that can retain a program and data even if the power is turned off. The ROM 505 stores a program and data such as BIOS (Basic Input/Output System) to be executed when the computer 500 starts, an OS setting, and a network setting.

The CPU 506 is an arithmetic device that implements the entire control and functions of the computer 500 by reading a program and data from the memory device such as the ROM 505 and the HDD 508 on the RAM 504.

The communication I/F 507 is an interface to connect the computer to the networks N1, N2 and N3. This allows the computer 500 to perform data communication through the communication I/F 507.

The HDD 508 is a non-volatile memory device storing a program and data. The stored program and data are, for example, an OS that is basic software controlling the whole computer 500, application software that provides a variety of functions on the OS and the like.

The external I/F 503 is an interface between the computer 500 and an external device. The external device includes, for example, a recording medium 503a. This enables the computer 500 to read and/or to write in the recording medium 503a through the external I/F 503. The recording medium 503a includes, for example, a flexible disk, a CD, a DVD, an SD memory card, and a USB memory.

The user terminal 11, the application market delivery server 21, the business terminal 51 and the license management server 52 of the present embodiment can implement a variety of processes described later by the hardware configuration of the above-mentioned computer 500. Furthermore, the information processing apparatus that implements the service delivery system 30 and the service platform delivery system 40 of the present embodiment can implement a variety of processes described later by the hardware configuration of the above-mentioned computer 500.

<Hardware Configuration of Image Forming Apparatus>

Figure 3:
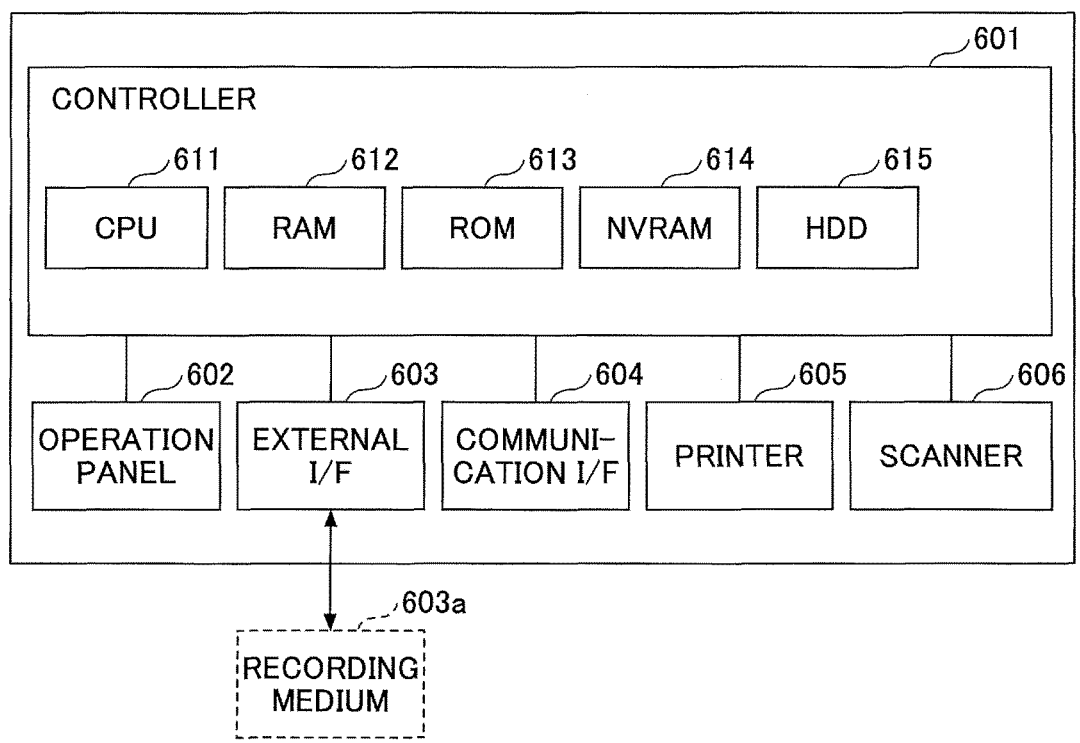
FIG. 3 is a hardware configuration diagram illustrating an example of an image forming apparatus according to an embodiment of the present invention.

For example, the image forming apparatus 12 illustrated in FIG. 1 can be implemented by a computer having a hardware configuration as illustrated in FIG. 3. FIG. 3 is a hardware configuration diagram illustrating an example of the image forming apparatus of the present embodiment. The image forming apparatus 12 illustrated in FIG. 3 includes a controller 601, an operation panel 602, an external I/F 603, a communication I/F 604, a printer 605, a scanner 606 and the like.

The controller 601 includes a CPU 611, a RAM 612, a ROM 613, a NVRAM 614 and an HDD 615. The ROM 613 stores a variety of programs and data. The RAM 612 temporarily holds a program and data. The NVRAM 614, for example, stores setting information and the like. The HDD 615 stores a variety of programs and data.

The CPU 611 implements the entire control and functions of the image forming apparatus 12 by reading a program, data, setting information and the like from the ROM 613, the NVRAM 614, the HDD 615 and the like on the RAM 612 and by executing a process.

The operation panel 602 includes an input unit that receives an input from a user and a display unit that performs display. The external I/F 603 is an interface between the computer and an external device. The external device includes, for example, a recording medium 603a and the like. This enables the image forming apparatus 12 to read and/or to write in the recording medium 603a through the external I/F 603. The recording medium 603a includes an IC card, a flexible disk, a CD, a DVD, an SD memory card, a USB memory and the like.

The communication I/F 604 is an interface that allows the image forming apparatus 12 to be connected to the network N2. This enables the image forming apparatus 12 to perform data communication through the communication I/F 604. The printer 605 is a printing device that prints print data on a sheet of paper. The scanner 606 is a reading device that reads image data (electronic data) from a manuscript. Here, a description of a hardware configuration of the firewall FW illustrated in FIG. 1 is omitted.

<Service Delivery System>

Figure 4:
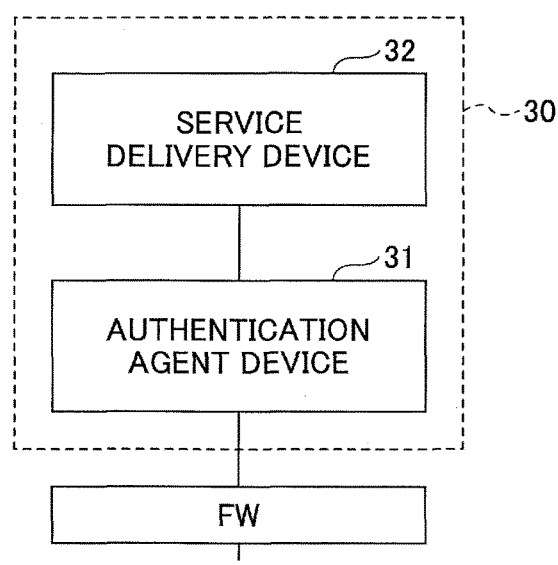
FIG. 4 is a configuration diagram illustrating an example of a service delivery system according to an embodiment of the present invention.

The service delivery system 30 according to the present embodiment can be implemented by a configuration, for example, as illustrated in FIG. 4. FIG. 4 is a configuration diagram of an example of the service delivery system 30 according to the first embodiment. The service delivery system 30 in FIG. 4 is configured to include an authentication agent device 31 and a service delivery device 32.

The authentication agent device 31 receives a variety of requests for the service delivery device 32 from the user terminal 11 and the image forming apparatus 12. The authentication agent device 31 performs an access control so as to send the service delivery device 32 a request from the user terminal 11 and the image forming apparatus 12 containing a valid authentication ticket issued from the service platform delivery system 40.

Moreover, the authentication agent device 31 can redirect the request from the user terminal 11 and the image forming apparatus 12 that does not contain the valid authentication ticket to the service platform delivery system 40. Thus, the authentication agent device 31 sends the request from the user terminal 11 and the image forming apparatus 12 to the service delivery device 32 after causing the user terminal 11 and the image forming apparatus 12 to obtain the valid authentication ticket.

The service delivery device 32 provides a service in response to the request from the user terminal 11 and the image forming apparatus 12. Furthermore, the service delivery device 32 sends an inquiry to the service platform delivery system 40 about the validity of the authentication ticket and requests information needed to provide the service.

A translation service is cited as an example of the service that the service delivery device 32 provides. The image forming apparatus 12 utilizes the translation service by optically recognizing a character of image data scanned from a manuscript and then sending the image data to the service delivery device 32. The service delivery device 32 may obtain user information as an example of information needed to provide the translation service. The user may view a translation result from the user terminal 11 by accessing the service delivery device 32, or may receive the translation result by email.

<Service Platform Delivery System>

Figure 5:
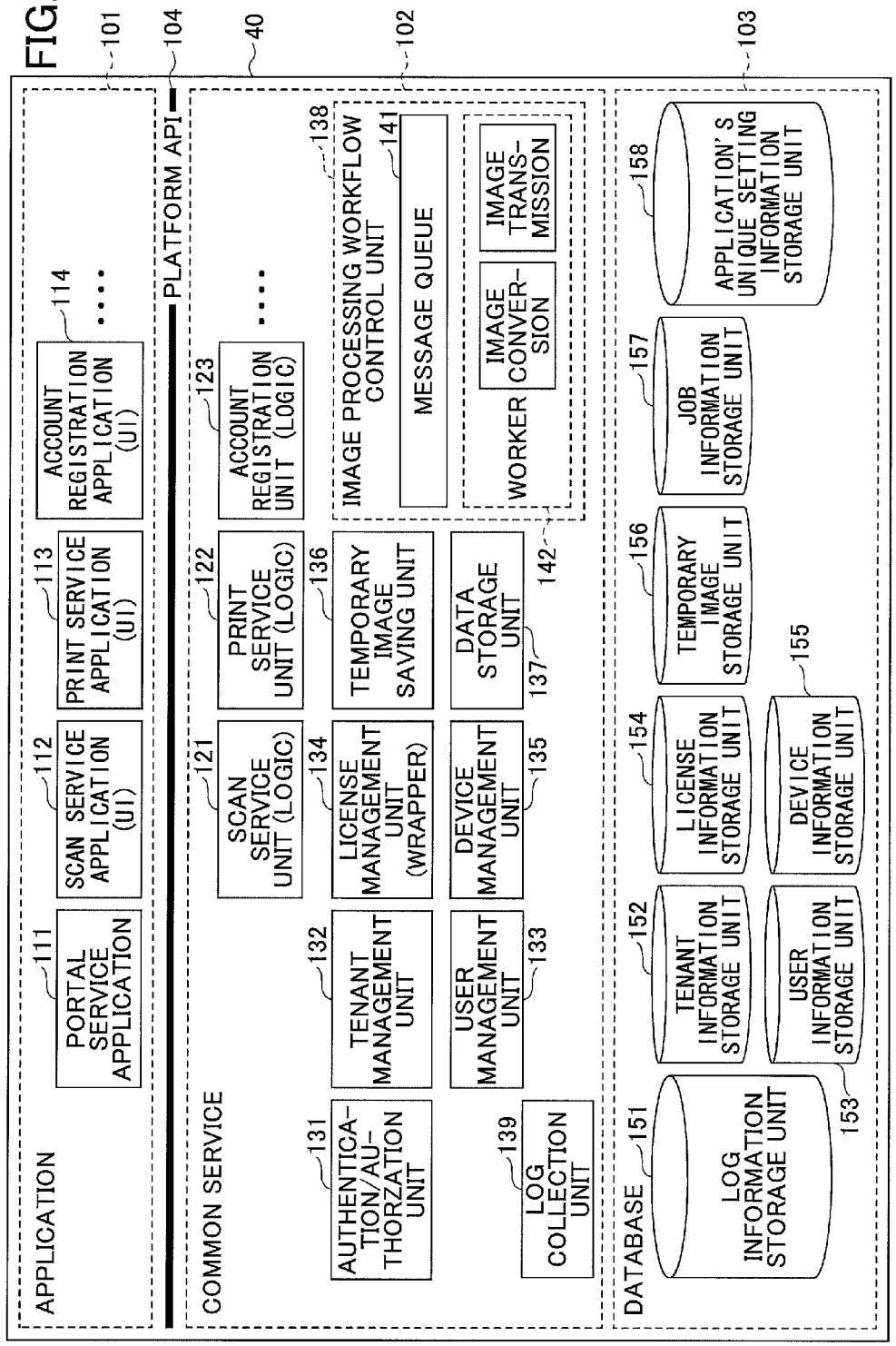
FIG. 5 is a processing block diagram illustrating an example of a service platform delivery system according to an embodiment of the present invention.

The service platform delivery system 40 according to the embodiment is implemented by, for example, a process block illustrated in FIG. 5. FIG. 5 is a process block diagram illustrating an example of the service platform delivery system 40 of the embodiment.

The service platform delivery system 40 in FIG. 5 implements an application 101, a common service 102, a data base (DB) 103, and a platform API (Application Programming Interface) 104.

The application 101 includes a portal service application 111, a scan service application 112, a print service application 113, and an account registration application 114 as an example.

The portal service application 111 is an application that provides a portal service. The portal service provides a service that becomes an entrance to utilize the information processing system 1. The scan service application 112 is a UI (User Interface) of an application that provides a scan service.

The print service application 113 is a UI of an application that provides a print service. The account registration application 114 is a UI of an application that provides an account registration service. Here, the application 101 may contain another service application.

Each UI of the scan service application 112, the print service application 113 and the account registration application 114 may contain Native application displayed or implemented by the user terminal 11 and/or the image forming apparatus 12, and HTML/JavaScript (Trademark) data. The Native application contrasts with a Web application, and is a type of application that causes the user terminal 11 and the image forming apparatus 12 to execute a main process. The Web application is a type of application that causes the service platform delivery system 40 to execute the main process.

The platform API (Application Programing Interface) 104 is an interface to allow the application 101 such as the portal service application 111 to utilize the common service 102.

The platform API 104 is a preliminarily defined interface provided to cause the common service 102 to receive a request from the application 101. The platform API 40 is, for example, constituted of a function, a class and the like. The platform API 104 can be implemented by, for example, a Web API available through a network when the service platform delivery system 40 is constituted of a plurality of information processing apparatuses.

The common service 102 includes a scan service unit 121, a print service unit 122, an account registration unit 123, an authentication/authorization unit 131, a tenant management unit 132, a user management unit 133, a license management unit 134, a device management unit 135, a temporary image saving unit 136, a data storage unit 137, an image processing workflow control unit 138, and a log collection unit 139. In addition, the image processing workflow control unit 138 includes a message queue 141, and at least one worker 142. The worker 142 implements a function of image conversion, image transmission and the like.

The scan service unit 121 functions as a logic unit (API) of the scan service application 112. The print service unit 122 functions as a logic unit (API) of the print service application 113. Also, the account registration unit 123 functions as a logic unit (API) of the account registration application 114.

The authentication/authorization unit 131 executes the authentication and the authorization based on a login request from an office device such as the user terminal 11 and the image forming apparatus 12. The office device is a generic term of the user terminal 11, the image forming apparatus 12 and the like.

The authentication/authorization unit 131 authenticates and authorizes a user by accessing, for example, a user information storage unit 153, a license information storage unit 154 and the like. Moreover, the authentication/authorization unit 131 performs client authentication for the image forming apparatus 12 and the like by accessing, for example, a tenant information storage unit 152, a license information storage unit 154, a device information storage unit 155 and the like.

The tenant management unit 132 manages tenant information stored in the tenant information storage unit 152. The user management unit 133 manages user information stored in the user information storage unit 153.

The license management unit 134 manages license information stored in the license information storage unit 154. The device management unit 135 manages device information stored in the device information storage unit 155. The temporary image saving unit 136 saves a temporary image in a temporary image storage unit 156, and obtains the temporary image from the temporary image storage unit 156. The data storage unit 137 stores data in a job information storage unit 157 and the like.

The image processing workflow unit 138 controls a workflow relating to an image process based on a request from the application 101. The message queue 141 has queues corresponding to types of processes. The image processing workflow control unit 138 puts a message of a request related to a process (job) in a queue corresponding to a type of the job.

The worker 142 monitors the corresponding queue. When the message is put in the queue, the worker 142 performs a process depending on the type of the corresponding job such as image conversion and image transmission. The worker 142 may voluntarily read out the message put in the queue (Pull), or the message may be provided from the queue for the worker 142 (Push). The log collection unit 139 stores collected log information, for example, in a log information storage unit 151.

The database 103 includes the log information storage unit 151, the tenant information storage unit 152, the user information storage unit 153, the license information storage unit 154, the device information storage unit 155, the temporary image storage unit 156, the job information storage unit 157, and an application's unique setting information storage unit 158.

The log information storage unit 151 stores log information. The tenant information storage unit 152 stores tenant information. The license information storage unit 154 stores license information. The device information storage unit 155 stores device information. The temporary image storage unit 156 stores a temporary image. The temporary image is, for example, a file or data of a scanned image processed by the worker 142 and the like.

The job information storage unit 157 stores information (job information) of a request related to a process (job). The application's unique setting information storage unit 158 stores setting information unique to the application 101.

The service platform delivery system 40 functions as a platform that provides a common service such as a workflow related to the authentication/authorization and the image process, and as a service group that provides an application service such as a scan service and a print service by utilizing the function of the platform.

The platform is, for example, constituted of the common service 102, the data base 103 and the platform API 104. The service group is, for example, constituted of the application 101. Thus, the service platform delivery system 40 illustrated in FIG. 5 is configured to have the service group separated from the platform.

Because the service platform delivery system 40 is configured to have the service group separated from the platform, the application 101 that utilizes the platform API 104 can be readily developed. Moreover, the service platform delivery service 40 illustrated in FIG. 5 can readily develop a service delivery system 30.

Here, a classification form of the process blocks of the service platform delivery system 40 illustrated in FIG. 5 is an example, and classifying the application 101, the common service 102 and the data base 103 according to a hierarchy illustrated in FIG. 5 is not required. For example, as long as the process of the service platform delivery system 40 can be performed, the hierarchy relationship illustrated in FIG. 5 is not limited to a specific form.

<Image Forming Apparatus>

Figure 6:
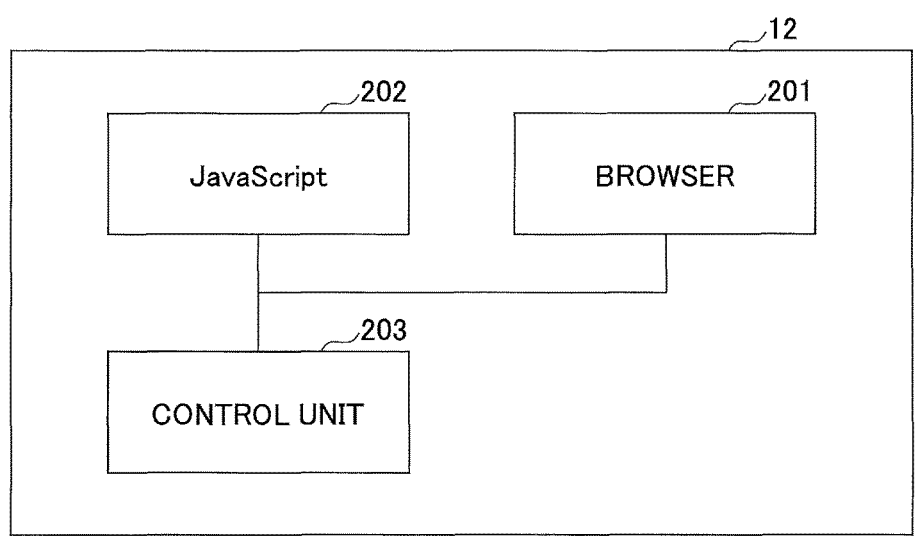
FIG. 6 is a processing block diagram illustrating an example of an image forming apparatus according to an embodiment of the present invention.

The image forming apparatus 12 of the embodiment is implemented, for example, by processing blocks illustrated in FIG. 6. FIG. 6 is a processing block diagram illustrating an example of the image forming apparatus 12 according to the embodiment. The image forming apparatus 12 illustrated in FIG. 6 implements, for example, a browser 201, a JavaScript 202, a control unit 203 and the like.

The browser 201 is, for example, a Web browser and displays a screen. The JavaScript 202 receives a JavaScript execution request from the browser 201 and controls a necessary process.

The control unit 203 receives a request from the JavaScript 202 and generates, for example, a device authentication token. Moreover, the control unit 203 stores the device authentication token in a memory area that can restrict access from the outside and whose security is ensured by a security chip such as a TPM (Trusted Platform Module) of the controller 601.

<Device Authentication Sequence Using Device Authentication Token>

Figure 7:
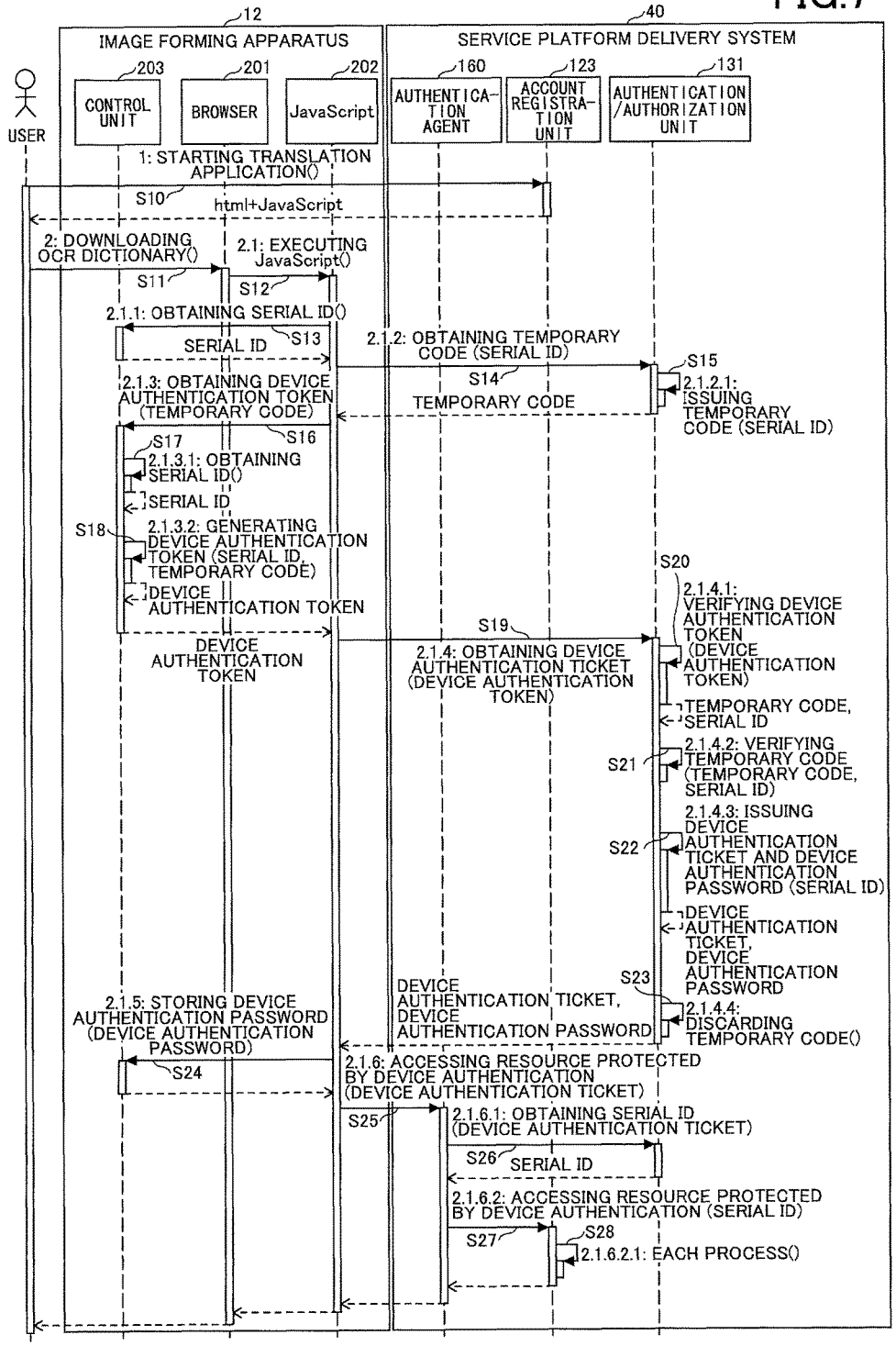
FIG. 7 is a diagram illustrating an example of a device authentication sequence using a device authentication token.

In the above-mentioned information processing system 1, the image forming apparatus 12 performs a device authentication and the like, for example, when accessing a resource of the service platform delivery system 40 utilizing an API in order to utilize a service provided from the service delivery system 30. FIG. 7 is a diagram illustrating an example of a device authentication sequence using a device authentication token.

The sequence illustrated in FIG. 7 is implemented by the browser 201, the JavaScript 202 and the control unit 203 in the image forming apparatus 12, and an authentication agent 160, the account registration unit 123 and the authentication/authorization unit 131 in the service platform delivery system 40.

Here, the authentication agent 160 is provided in the application 101 or the common service 102 of the service platform delivery system 40 illustrated in FIG. 5. For example, the authentication agent 160 receives a variety of requests of the account registration unit 123 and the like from the image forming apparatus 12. The authentication agent 160 receives only a request including a valid device authentication ticket and the like issued from the service platform delivery system 40 among requests from the image forming apparatus 12 to access the resource of the service platform delivery system 40 utilizing the API.

In the example of FIG. 7, the image forming apparatus 12 requests the account registration unit 123 of the service platform delivery system 40 to start (S10) upon receiving activation of a translation application from a user, and obtains HTML/JavaScript data. The browser 201 of the image forming apparatus 12 receives a request and the like to download an OCR dictionary used for character recognition of the translation service from the user (S11), and then requests the JavaScript 202 to execute JavaScript (S12).

Here, the JavaScript 202 determines a type of an authentication method of protecting the resource of the service platform delivery system 40 utilizing the API from access in response to the request to utilize the API of the service platform delivery system 40 such as the request to download the OCR dictionary.

For example, when determining that a device authentication is needed, the JavaScript 202 requests from the control unit 203 a serial ID (device information) that is identification information peculiar to each of the image forming apparatus 12 (S13), and then obtains the serial ID.

Next, the JavaScript 202 requests a temporary code from the authentication/authorization unit 131 in the service platform delivery system 40 by specifying the serial ID (S14).

The authentication/Authorization unit 131 issues the temporary code by generating random numbers (S15), and then creates a temporary code table matching the serial ID to the issued temporary code.

Next, the JavaScript 202 requests a device authentication token from the control unit 203 upon obtaining the temporary code from the service platform delivery system 40 (S16). The control unit 203 obtains the serial ID (S17), and then generates an encrypted device authentication token including the serial ID and the temporary code (S18).

In the process of S18, the control unit 203 can generate, for example, the device authentication token constituted of a different character string each time by using the serial ID and the temporary code. Furthermore, the control unit 203 can improve security much further by storing the device authentication token in the memory area of the controller 601 and the like that cannot be readily accessed from the outside.

Subsequently, the JavaScript 202 requests the device authentication ticket from the authentication/authorization unit 131 by specifying the device authentication token obtained from the control unit 203 (S19). The authentication/authorization unit 131 verifies the device authentication token obtained from the image forming apparatus 12 (S20).

In the process of S12, the authentication/authorization unit 131 decrypts the device authentication ticket, and extracts the temporary code and the serial ID contained in the device authentication ticket. The authentication/authorization unit 131 matches the temporary code and the serial ID extracted by decrypting the device authentication ticket to a combination of a temporary code and a serial ID managed by the temporary code table, thereby determining whether the temporary code and the serial ID from the device authentication ticket match the temporary code and the serial ID in the temporary code table (S21).

The authentication/authorization unit 131 issues a device authentication ticket and a device authentication password that indicate validity of the device upon determining that the temporary code and serial ID from the device authentication ticket and those in the temporary code table match, respectively, in the process of S21 (S22). In the process of S22, the authentication/authorization unit 131 creates a device authentication ticket table associating the issued device authentication ticket with the serial ID and a device authentication password table associating the issued device authentication password with the serial ID.

Here, in the process of S22, permitting an issue of the device authentication ticket only to the image forming apparatus 12 to which the temporary code is issued is possible by determining that the combination of the temporary code and the serial ID of the table matches the combination of the extracted temporary code and serial ID.

Next, the authentication/authorization unit 131 discards the temporary code used from the temporary code table (S23). Thus, the number of being able to generate the device authentication token utilizing a certain temporary code can be limited by discarding the temporary code used from the temporary code table. In addition, even if the device authentication token is leaked, preventing the device authentication ticket from being obtained is possible.

Subsequently, upon obtaining the device authentication ticket and the device authentication password issued in the process of S22, the JavaScript 202 requests the control unit 203 to store, for example, the device authentication password (S24). Thus, by storing the device authentication password, for example, after the next time, issuing the device authentication ticket by using the device authentication password is possible.

Next, the JavaScript 202 requests the authentication agent 160 to allow the image forming apparatus 12 to download the OCR dictionary (the request to access the resource protected by the device authentication) by using the device authentication ticket obtained from the service platform delivery system 40 (S25).

The authentication agent 160 checks whether the device authentication ticket is valid by requesting the serial ID from the authentication/authorization unit 131 (S26). When the authentication/authorization unit 131 establishes that the device authentication ticket is valid with reference to the device authentication table, the authentication agent 160 obtains the serial ID, and requests the account registration unit 123 to allow the authentication agent 160 to download the OCR dictionary by using the serial ID and the like (S27).

The account registration unit 123 performs a process depending on the request in S27 (S28). By a process of S28, the image forming apparatus 12 can download, for example, the OCR dictionary and the like from the service platform delivery system 40.

In the sequence illustrated in FIG. 7, because the image forming apparatus 12 generates a different device authentication token each time by using the temporary code and obtains the device authentication ticket, security strength can be enhanced against the access from the service platform delivery system 40.

<Device Authentication Sequence Using Device Authentication Password>

Figure 8:
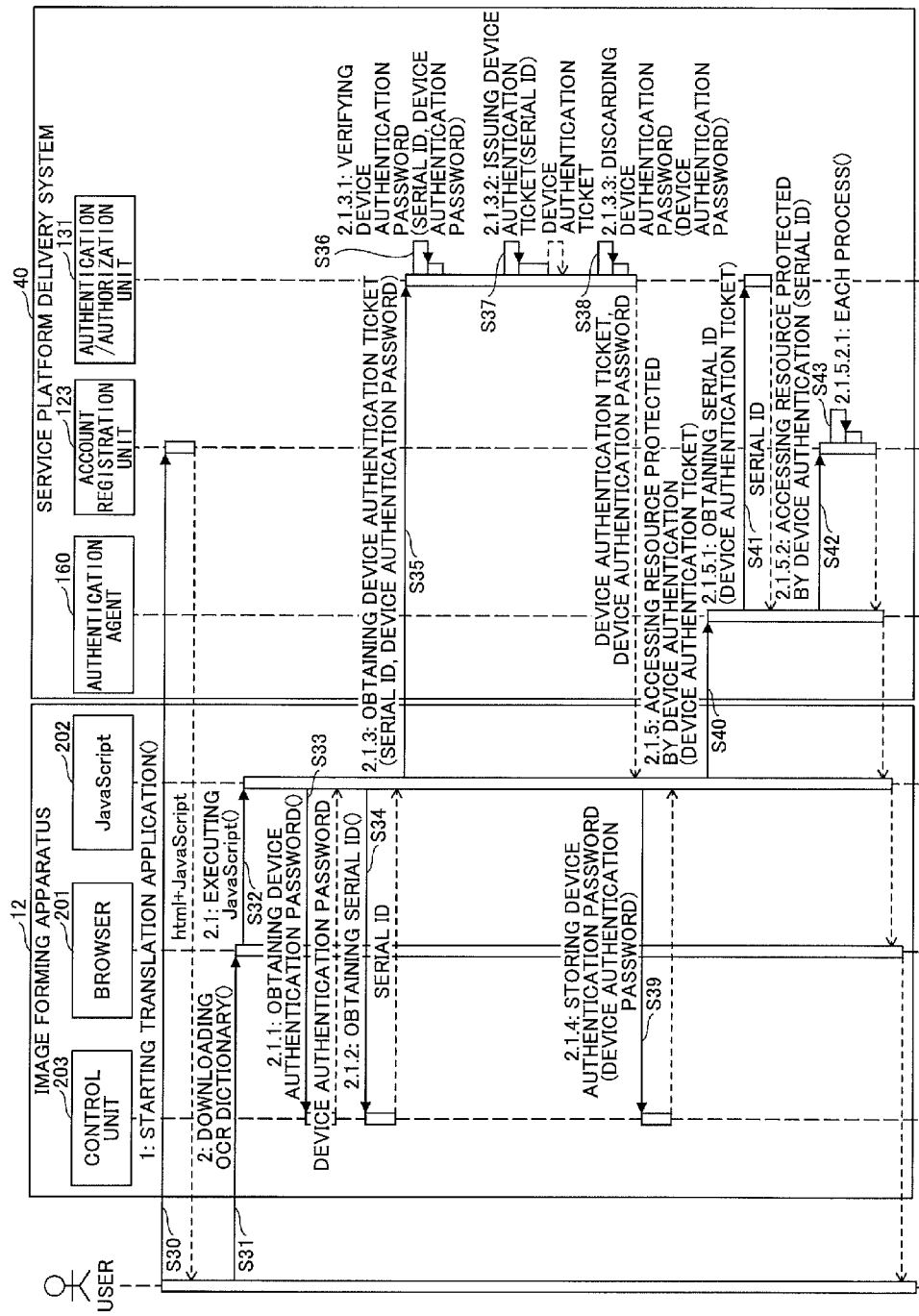
FIG. 8 is a diagram illustrating an example of a device authentication sequence using a device authentication password.

Next, a description is given below of a device authentication sequence using a device authentication password issued together with a device authentication ticket in the sequence illustrated in FIG. 7. FIG. 8 is a diagram illustrating an example of the device authentication sequence using the device authentication password.

The sequence illustrated in FIG. 8 is implemented by the browser 201, the JavaScript 202 and the control unit 203 in the image forming apparatus 12, and the authentication agent 160, the account registration unit 123 and the authentication/authorization unit 131 in the service platform delivery system 40. Here, because processes of S30 through S32 of the sequence illustrated in FIG. 8 are the same as the processes of S10 through S12 of the sequence illustrated in FIG. 7, the description is omitted here.

In the examples of FIG. 8, in the image forming apparatus 12, the JavaScript 202 requests a device authentication password from the control unit 203 upon determining that device authentication is needed in the process of S32 (S33). Because the device authentication password is stored after the above-mentioned sequence illustrated in FIG. 7, the JavaScript 202 obtains the device authentication password from the control unit 203. Here, the JavaScript 202 proceeds with the process of S13 illustrated in FIG. 7 when the device authentication password is not stored.

Next, the JavaScript 202 requests a serial ID of the image forming apparatus 12 from the control unit 203 (S34), and obtains the serial ID. Next, the JavaScript 202 requests a device authentication ticket from the authentication/authorization unit 131 by specifying the serial ID and the device authentication password (S35). The authentication/authorization unit 131 verifies the device authentication password by using the serial ID obtained from the image forming apparatus 12 (S36).

In the process of S36, because the combination of the device authentication password and the serial ID issued in the process of S22 of the sequence illustrated in FIG. 7 is managed in the device authentication password table, the authentication/authorization unit 131 determines whether the serial ID and the device authentication password managed in the device authentication password table match a combination of the serial ID and the device authentication password obtained from the image forming apparatus 12.

The authentication/authorization unit 131 issues the device authentication ticket and a new device authentication password upon determining that the combination of the serial ID and the device authentication password in the device authentication password table matches the combination of the serial ID and the device authentication password from the image forming apparatus 12 in the process of S36 (S37). In the process of S37, the authentication/authorization unit 131 creates a device authentication ticket table associating the issued device authentication ticket with the serial ID, and a device authentication password table associating the newly issued device authentication password with the serial ID.

Next, the authentication/authorization unit 131 discards the device authentication password used from the device authentication password table (S38). Thus, by discarding the device authentication password utilized once, limiting a number of issuance times is possible so as to permit only one device authentication ticket to be issued from a certain device authentication password. Moreover, even if the device authentication password is leaked, preventing the device authentication ticket from being obtained is possible.

The JavaScript 202 requests the control unit 203 to store the new device authentication password upon obtaining the device authentication ticket and the new device authentication password issued in the process of S37 from the service platform delivery system 40 (S39). In the process of S39, the new device authentication password issued in the process of S37 is stored.

Subsequently, the JavaScript 202 requests the authentication agent 160 to allow the image forming apparatus 12 to download the OCR dictionary and the like by using the device authentication ticket obtained from the service platform delivery system 40 (S40). Here, because processes of S41 through S43 after this process are the same as the processes from S26 to S28 illustrated in FIG. 7, the description is omitted here.

In the sequence illustrated in FIG. 8, the image forming apparatus 12 obtains the device authentication ticket from the service platform delivery system 40 by using the device authentication password issued together with the device authentication ticket. In the sequence illustrated in FIG. 8, because the encrypting process when generating the device authentication ticket in the image forming apparatus 12 and the decrypting process in the service platform delivery system 40 do not need to be performed, responsiveness when accessing the resource of the service platform delivery system 40 can be improved.

<Case of Device Authentication Ticket Held in Browser>

Figure 9:
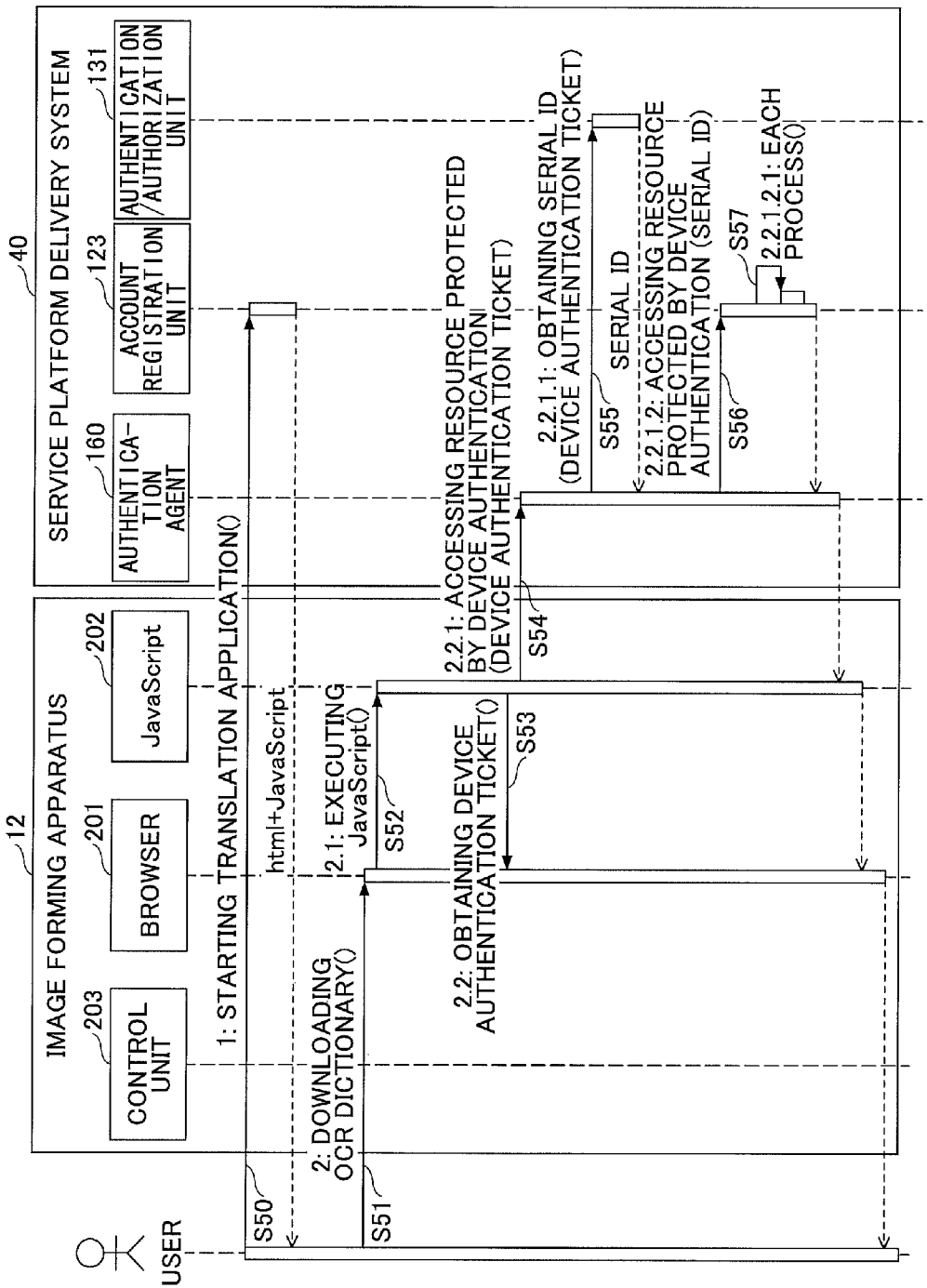
FIG. 9 is a diagram illustrating an example of a device authentication sequence when holding a device authentication ticket.

Next, a description is given below of the case in which the browser 201 of the image forming apparatus 12 holds the device authentication ticket obtained by the sequence illustrated in FIG. 7 or 8. FIG. 9 is a diagram illustrating an example of a device authentication sequence when the browser 201 holds a device authentication ticket.

The sequence illustrated in FIG. 9 is implemented by the browser 201, the JavaScript 202 and the control unit 203 in the image forming apparatus 12, and the authentication agent 160, the account registration unit 123 and the authentication/authorization unit 131 in the service platform delivery system 40. Here, because processes of S50 through S52 of the sequence illustrated in FIG. 9 are the same as the processes from S10 to S12, the description is omitted here.

In the example of FIG. 9, in the image forming apparatus 12, upon determining that device authentication is necessary in a process of S52, the JavaScript 202 requests a device authentication ticket from the browser 201 for (S53). After the sequence illustrated in FIG. 7 or FIG. 8, when a device authentication ticket is stored in a Cookie, the browser 201 obtains the device authentication ticket from the browser 201.

Next, then image forming apparatus 12 requests the authentication agent 160 to allow the image forming apparatus 12 to download the OCR dictionary and the like by using the device authentication ticket (S54). Here, because processes of S55 through S57 after this process are the same as the processes of S26 through S28 illustrated in FIG. 7, the description is omitted here.

The sequence illustrated in FIG. 9, because the image forming apparatus 12 uses the device authentication ticket obtained from the service platform delivery system 40 and held in the browser 201, the responsiveness when accessing the resource of the service platform delivery system 40 can be further much enhanced.

<Sequence Combining Device Authentication with Tenant Authentication>

Figure 10:
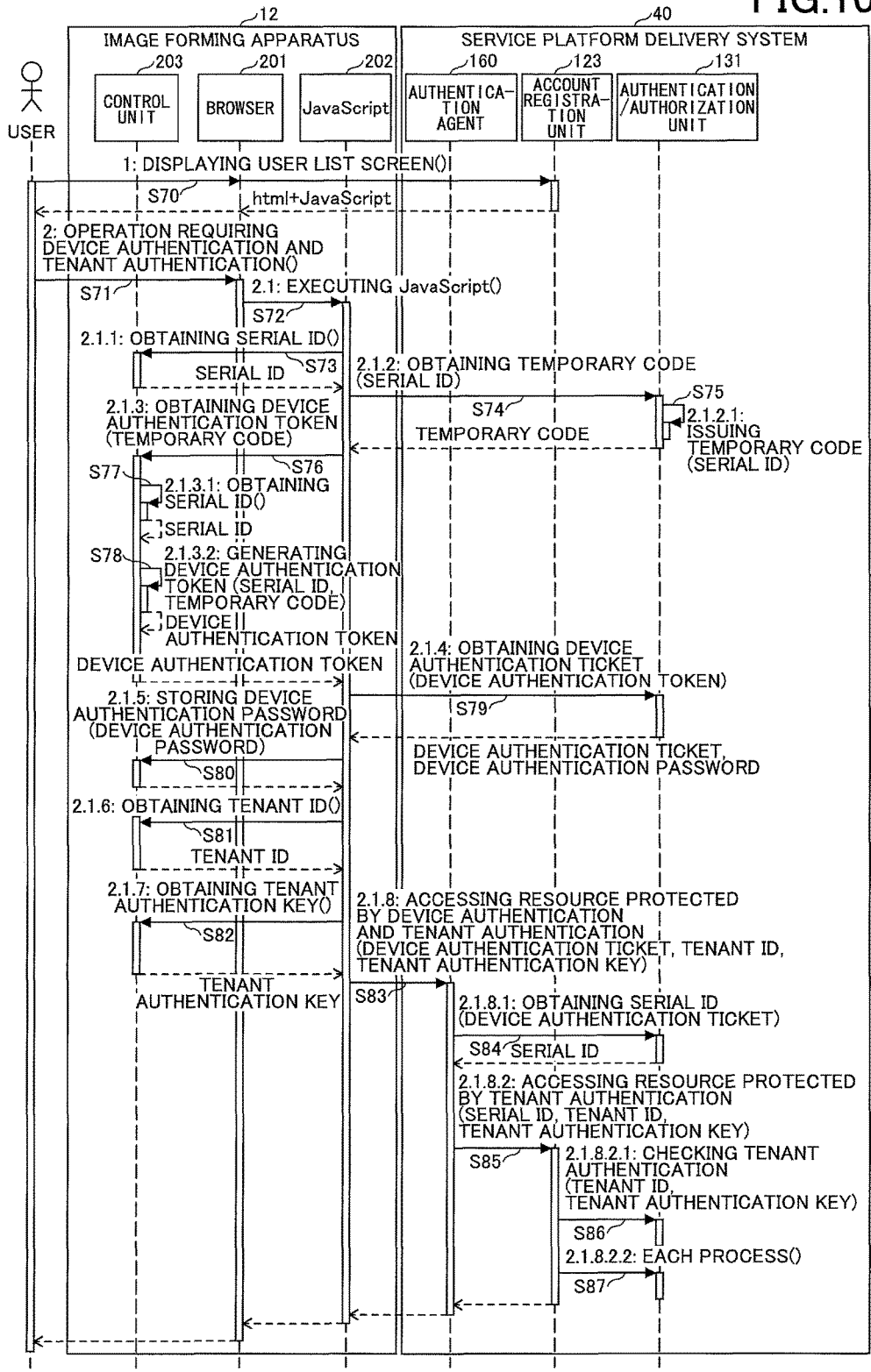
FIG. 10 is a diagram illustrating an example of a sequence combining a device authentication and a tenant authentication.

Next, a description is given below of an example of performing tenant authentication in addition to the above-mentioned device authentication when the image forming apparatus 12 accesses the resource of the service platform system 40 in the above-discussed information processing system 1. FIG. 10 is a diagram illustrating an example of a sequence combining the tenant authentication with the device authentication.

The sequence illustrated in FIG. 10 is implemented by the browser 201, the JavaScript 202 and the control unit 203 in the image forming apparatus 12, and the authentication agent 160, the account registration unit 123 and the authentication/authorization unit 131 in the service platform delivery system 40. Here, in the example of FIG. 10, a description is given below of the example in which the image forming apparatus 12 has received a request to display a user list screen utilizing a translation service from a user as an example of the device authentication and the tenant authentication being needed.

In the example of FIG. 10, the image forming apparatus 12 requests the account registration unit 123 of the service platform delivery system 40 to allow the image forming apparatus 12 to display a user list screen on the browser 201 upon receiving a display request to display the user list screen from a user (S70), and obtains the HTML/JavaScript data.

The browser 202 of the image forming apparatus 12 receives an operation requiring the above-mentioned device authentication and tenant authentication (S71), and requests the JavaScript 202 to execute the JavaScript (S72). The JavaScript 202 requests a serial ID from the control unit 203 upon determining that the device authentication is needed at first as an authentication method of protecting the resource of the service platform delivery system 40 utilizing the API from access (S73), and obtains the serial ID.

Next, the JavaScript 202 requests a temporary code from the authentication/authorization unit 131 of the service platform delivery system 40 by specifying the serial ID (S74). Because processes of S75 through S80 after this process are the same as the processes of S15 through S24 illustrated in FIG. 7, the description is omitted here.

The JavaScript 202 requests a tenant ID from the control unit 203 upon determining that the tenant authentication is needed secondly as the authentication method of protecting the resource of the service platform delivery system 40 utilizing the API from access (S81), and obtains the tenant ID. Moreover, the JavaScript 202 requests a tenant authentication key from the control unit 203 (S82), and obtains the tenant authentication key.

The above-mentioned tenant ID and tenant authentication key are what the image forming apparatus 12 has obtained from the service platform delivery system 40 at the first login to the service platform delivery service 40 and stores therein to utilize the translation service and the like. Here, the service platform delivery system 40 issues the tenant ID and the tenant authentication key to each tenant to which the image forming apparatus belong, and manages the image forming apparatus 12 by using the tenant ID and the tenant authentication key.

Next, the JavaScript 202 requests the authentication agent 160 to allow the image forming apparatus 12 to display the user list screen on the browser 201 and the like (request to access the resource protected by the device authentication and the tenant authentication) by using the device authentication ticket, the tenant ID and the tenant authentication key (S83).

The authentication agent 160 checks whether the device authentication ticket is valid by requesting the serial ID from the authentication/authorization unit 131 (S84). When the authentication/authorization unit 131 establishes that the device authentication ticket is valid, the authentication agent 160 obtains the serial ID, and requests the account registration unit 123 to allow the image forming apparatus 12 to display the user list screen on the browser 201 (request to access the resource protected by the tenant authentication) and the like by using the serial ID, the tenant ID and the tenant authentication ID (S85).

The account registration unit 123 requests the authentication/authorization unit 131 to authenticate the tenant authentication (S86). When the authentication/authorization unit 131 checks whether the tenant authentication and the tenant authentication key are valid with reference to a tenant information table and establishes that the tenant authentication and the tenant authentication key are valid, the account registration unit 123 performs a process depending on the request in S85 (S87). By the process of S87, the image forming apparatus 12 can obtain, for example, information to display the user list screen from the service platform delivery system 40.

In the above-discussed sequence of FIG. 10, because the device authentication and the tenant authentication are combined with each other, for example, limiting the leaked resource to an accessible range for each tenant is possible. Moreover, although the tenant ID and the tenant authentication key are used in the example of FIG. 10, for example, the tenant authentication may be performed by preliminarily registering a model and a machine number (e.g., serial ID) of the image forming apparatus 12 associated with the tenant ID and by using the tenant ID, and a model and a machine number of the image forming apparatus 12.

<Sequence Notified of Whether to Need Device Authentication>

In the above-mentioned sequences illustrated in FIGS. 7 through 10, the image forming apparatus 12 determines a type of the authentication method of protecting the resource of the service platform delivery system 40 utilizing the API from access. In contrast, the service platform delivery system 40 can determine what the authentication method is like and convey the contents of the authentication method instead of the image forming apparatus 12. FIG. 11 is a diagram illustrating a sequence notified of whether to need the device authentication.

The sequence illustrated in FIG. 11 is implemented by the browser 201 and the JavaScript 202 in the image forming apparatus 12, and the authentication agent 160 and the authentication/authorization unit 131 in the service platform delivery system 40.

In the example of FIG. 11, the browser 201 of the image forming apparatus 12 requests the JavaScript 202 to execute the JavaScript (S60). The JavaScript 202 requests the service platform delivery system 40, for example, to allow the image forming apparatus 12 to utilize the API protected by the device authentication (S61).

The authentication agent 160 requests the authentication/authorization unit 131 to determine whether the authentication included in the request received in the process of S61 is valid (S62). The authentication/authorization unit 131 determines whether the authentication is valid (S63).

In the process of S63, the authentication/authorization unit 131 refers to a table setting an authentication method for determining whether to need the device authentication, the tenant authentication or the user authentication for each request to utilize the API of the service platform delivery system 40 made from the image forming apparatus 12, such as the request to download the OCR dictionary and the request to display the user list screen.

Next, the authentication/authorization unit 131 determines whether the request received from the image forming apparatus 12 includes a device authentication ticket and the device authentication ticket is valid upon, for example, determining that the device authentication is necessary. Furthermore, the authentication/authorization unit 131 determines whether the request received from the image forming apparatus 12 includes a tenant ID, a tenant authentication key and the like and the tenant ID and the tenant authentication key is valid upon, for example, determining that the tenant authentication is necessary.

In the process of S63, because the request received from the image forming apparatus 12 does not include the device authentication ticket and the like, the authentication fails. Accordingly, the authentication/authorization unit 131 creates an error message (S64).

In the process of S64, for example, when the device authentication, the tenant authentication and the like are necessary, the authentication/authorization unit 131 makes an error message to convey the contents. For example, the authentication/authorization unit 131 may create an error message to convey the validity and the like of the device authentication ticket, the tenant ID, and the tenant authentication key.

By the above-mentioned sequence illustrated in FIG. 11, the image forming apparatus 12 can convey the authentication method necessary for a user based on the authentication method conveyed from the service platform delivery system 40.

<Structural Example of Various Tables>

A description is given below of structural examples of various tables used in the above-mentioned service platform delivery system 40. FIGS. 12A through 12D are diagrams illustrating examples of various tables. FIG. 12A is a diagram illustrating a structural example of a temporary code table. FIG. 11B is a diagram illustrating a structural example of a device authentication ticket table. FIG. 12C is a diagram illustrating a structural example of a device authentication password table. FIG. 12D is a diagram illustrating a structural example of a tenant information table.

The temporary code table illustrated in FIG. 12A includes data items such as a "temporary code for device authentication", a "model and machine number" and a "creation date and time", but contents and an order of the items are not limited to the example.

The "temporary code for device authentication" stores the temporary code issued from the authentication/authorization unit 131 of the service platform delivery system 40. The "model and machine number" stores information for identifying a model type (e.g., serial ID) of the image forming apparatus 12 that has issued the temporary code. The "creation date and time" stores a date and time when the temporary code has been issued. The "creation date and time" is, for example, used to set an expiration date of the temporary code.

The device authentication ticket table illustrated in FIG. 12B includes data items such as a "device authentication ticket", a "model and machine number" and a "creation date and time", but contents and an order of the items are not limited to the example.

The "device authentication ticket" stores the device authentication ticket issued from the authentication/authorization unit 131 of the service platform delivery system 40. The "model and machine number" stores information for identifying a model type (e.g., serial ID) of the image forming apparatus 12 that has issued the temporary code. The "creation date and time" stores a date and time when the temporary code has been issued. The "creation date and time" is, for example, used to set an expiration date of the temporary code.

The device authentication ticket table illustrated in FIG. 12C includes data items such as a "device authentication password", a "model and machine number" and a "creation date and time", but contents and an order of the items are not limited to the example.

The "device authentication password" stores the device authentication password issued from the authentication/authorization unit 131 of the service platform delivery system 40 together with the device authentication ticket. The "model and machine number" stores information for identifying a model type (e.g., serial ID) of the image forming apparatus 12 that has issued the temporary code. The "creation date and time" stores a date and time when the temporary code has been issued. The "creation date and time" is, for example, used to set an expiration date of the temporary code.

The device authentication ticket table illustrated in FIG. 12D includes data items such as a "tenant ID" and a "tenant ID key", but contents and an order of the items are not limited to the example.

The "tenant ID" stores information for identifying a group of a company, department and the like. Here, the tenant is not limited to the literal meaning, and for example, tenant information to identify a contract may be stored. The tenant ID is, for example, issued to each tenant that the image forming apparatus 12 belongs to. The "tenant authentication key" stores the authentication key issued together with tenant ID.

By referring to the table illustrated in FIG. 12, the authentication/authorization unit 131 of the service platform delivery system can determine whether the temporary code and the device authentication ticket are valid in the verification of each of the above-mentioned authentication methods.

According to the above-mentioned embodiments, for example, in accessing the resource of the service platform delivery service 40 utilizing the API, the authentication can be performed in a simpler method by performing the device authentication of the image forming apparatus 12 without requesting the user authentication from a user. Moreover, by performing the tenant authentication in addition to the device authentication, the security strength can be further increased.

The present invention is not limited to the above specifically disclosed embodiments, but various changes, modifications or alternations can be made without departing from the claimed invention. Here, the image forming apparatus 12 is an example of a service utilizing device. The authentication/authorization unit 131 of the service platform delivery system 40 is an example of a temporary code issuing unit, a device authentication ticket issuing unit, a device authentication password issuing unit, and an authentication unit. The control unit 203 of the image forming apparatus is an example of a device token authentication generation unit. The JavaScript 202 is an example of an access unit, and a determination unit.

The present application is based on and claims the benefit of priority of Japanese Priority Patent Application No. 2014-223357, filed on Oct. 31, 2014, the entire contents of which are incorporated herein by reference.

What is claimed is:

1. An information processing system, comprising:
a service utilizing device;
at least one information processing device configured to provide a service for the service utilizing device;
a controller provided in the service utilizing device and configured to control operation of the service utilizing device, the controller storing device information to identify the service utilizing device;
a script provided in the service utilizing device and obtaining data from the at least one information processing device;
a browser provided in the service utilizing device and configured to receive a service utilizing request from a user and to execute the script in response to the service utilizing request from the user, the script obtaining the device information from the controller; and
an authentication unit configured to issue a temporary code associated with the device information acquired from the script and to store the temporary code associated with the device information, the authentication unit being provided in the at least one information processing device,
wherein the controller generates a device authentication token by using the temporary code and the device information obtained from the authentication unit in the at least one information processing device,
wherein the authentication unit is configured to verify whether or not the device authentication token obtained from the controller in the service utilizing device is valid by checking whether the temporary code and the device information contained in the device authentication token match the temporary code and the device information previously issued from and stored in the authentication unit and to issue a device authentication ticket depending on a verification result,
wherein the authentication unit discards the temporary code after using the temporary code to verify whether or not the device authentication token is valid, and
wherein the script is configured to access a resource in the at least one information processing device by using the device authentication ticket obtained from the at least one information processing device.

2. The information processing system of claim 1,
wherein the at least one information processing device includes a device authentication password issuing unit configured to issue a device authentication password together with the issuance of the device authentication ticket, and
the device authentication unit verifies whether or not the device authentication password obtained from the service utilizing device is valid and to issue the device authentication ticket depending on the verification result.

3. The information processing system of claim 2, wherein the at least one information processing device limits a number of times that the controller can generate the device authentication token by using the temporary code or a number of times that the device authentication unit can issue the device authentication ticket by using the device authentication password.

4. The information processing system of claim 1,
wherein the service utilizing device stores the device authentication token in a memory area that can restrict access from the outside.

5. The information processing system of claim 1, wherein the controller is configured to generate the device authentication token by encrypting the temporary code and the device information of the service utilizing device.

6. The information processing system of claim 1,
wherein the at least one information processing device is configured to manage the service utilizing device by using tenant information issued to each tenant to which the service utilizing device belongs, and
the script is configured to access the resource of the at least one information processing device by using the device authentication ticket and the tenant information obtained from the at least one information processing device.

7. The information processing system of claim 1, wherein the service utilizing device includes a determination unit configured to determine an authentication method of protecting the resource of the at least one information processing device utilizing an API (Application Programming Interface) from access in response to a request to utilize the API received from a user.

8. The information processing system of claim 1, wherein the at least one information processing device includes an authentication unit configured to determine an authentication method of protecting the resource of the at least one information processing device utilizing an API (Application Programming Interface) from access in response to a request to utilize the API received from the service utilizing device.

9. An authorization method executed by an information processing system including a service utilizing device, and at least one information processing device configured to provide a service for the service utilizing device, the method comprising steps of:
receiving a request for the service by the service utilizing device from a user;
executing a script data obtained from the at least one information processing device by a browser in response to the request from the user;
obtaining device information to identify the service utilizing device from a controller provided in the service utilizing device by the script;

issuing a temporary code associated with the device information by acquiring the device information from the script by the at least one information processing device;

storing the temporary code associated with the device information in the at least one information processing unit;

generating a device authentication token by the controller in the service utilizing device by using the temporary code and the device information obtained from the at least one information processing device;

verifying, by the at least one information processing device, whether the device authentication token obtained from the service utilizing device is valid by checking whether the temporary code and the device information contained in the authentication token match the temporary code and the device information previously issued from and stored in the at least one information processing device;

issuing a device authentication ticket from the at least one information processing device depending on a verification result, discarding the temporary code after issuing the device authentication ticket; and accessing a resource of the at least information processing device by using the device authentication ticket obtained from the at least one information processing device by the service utilizing device.

10. The authorization method of claim 9, further comprising between the steps of storing the temporary code associated with the device information and verifying whether the device authentication token obtained from the service utilizing device is valid:

obtaining the temporary code with the device information from the at least one information processing device by the script; and requesting the controller to generate the device authentication token by the script.

* * * * *